(12) United States Patent
Wood

(10) Patent No.: US 7,891,888 B2
(45) Date of Patent: Feb. 22, 2011

(54) CAMERA SLIDER SYSTEM

(76) Inventor: Dennis Wood, 106 N. Cumberland, Unit 208, Thunder Bay, ON (CA) P7A 4M2

( * ) Notice: Subject to any disclaimer, the term of this patent is extended or adjusted under 35 U.S.C. 154(b) by 0 days.

(21) Appl. No.: 12/484,362

(22) Filed: Jun. 15, 2009

(65) Prior Publication Data

US 2010/0008661 A1    Jan. 14, 2010

Related U.S. Application Data

(63) Continuation-in-part of application No. 12/246,548, filed on Oct. 7, 2008, now Pat. No. 7,854,556.

(30) Foreign Application Priority Data

Oct. 7, 2008    (CA) .................................... 2641010

(51) Int. Cl.
    *G03B 17/00* (2006.01)
(52) U.S. Cl. ............................. 396/428; 396/5; 396/419
(58) Field of Classification Search ...................... 396/5, 396/419, 422, 428
    See application file for complete search history.

(56) References Cited

U.S. PATENT DOCUMENTS

| | | | | |
|---|---|---|---|---|
| 2,811,076 A * | 10/1957 | Pollick | .......................... | 352/85 |
| 3,516,343 A * | 6/1970 | Tunney | ........................ | 396/428 |
| 3,598,355 A * | 8/1971 | English | ....................... | 396/428 |
| 3,613,546 A * | 10/1971 | Richardson | .................. | 396/428 |
| 3,820,134 A * | 6/1974 | Wilton et al. | ................ | 396/428 |
| 4,318,605 A * | 3/1982 | Perisic | ......................... | 396/428 |
| 4,699,484 A * | 10/1987 | Howell et al. | ................ | 352/243 |
| 5,225,863 A * | 7/1993 | Weir-Jones | ................... | 396/56 |
| 5,908,181 A * | 6/1999 | Valles-Navarro | ......... | 248/177.1 |
| 2005/0231689 A1* | 10/2005 | Longley | ...................... | 352/243 |

* cited by examiner

*Primary Examiner*—W. B. Perkey
*Assistant Examiner*—Warren K Fenwick
(74) *Attorney, Agent, or Firm*—Ryan W. Dupuis; Kyle R. Satterthwaite; Ade & Company Inc

(57) ABSTRACT

The camera slider system supports a camera for longitudinal sliding or rolling movement along a pair of elongate support members which are parallel and spaced apart from one another. The camera mount supporting the camera thereon is supported by a pair of link members pivotally coupled between opposing ends of the camera mount and a carriage assembly which is movable along the rails. The orientation of the camera relative to the elongate supports is readily adjustable by adjusting the pivotal link members while the camera remains supported in a very stable configuration. Rollers or bearings ensure a smooth movement of the camera along the elongate support members so that there are no undesired jerking movements in the resulting captured image.

20 Claims, 11 Drawing Sheets

CAMERA SLIDER SYSTEM

This application is a Continuation-in-part of U.S. patent application Ser. No. 12/246,548, filed Oct. 7, 2008 now U.S. Pat. No. 7,854,556 and claims foreign priority benefits from Canadian Patent Application No. 2,641,010 filed Oct. 7, 2008 and Canadian Patent Application No. 2,687,177 filed May 12, 2009.

FIELD OF THE INVENTION

The present invention relates to a camera slider system comprising a camera mount arranged to support a video camera thereon for movement with the camera mount along a pair of elongate support members, and more particularly relates to a camera slider system in which the camera mount is adjustable relative to a carriage assembly supported for movement along the elongate support members.

BACKGROUND

When filming with a video camera, a common method of capturing video involves displacing the camera along a track using a dolly. Known dolly constructions however generally are quite large requiring equipment that is expensive and awkward to transport to support the camera for rolling movement along the tracks.

One example of a smaller camera support for replicating a dolly shot is available by Indislider. The product available by Indislider comprises a plate fixed onto blocks which are supported therebelow for sliding movement along respective rails received through apertures in the blocks. The sliding configuration of the blocks can interfere with the desired smooth and continuous motion of the camera. Furthermore the direct mounting of the plate on the slider blocks limits the adjustability of the camera positioning so that a limited number of different types of shots are available.

SUMMARY OF THE INVENTION

According to one aspect of the invention there is provided a camera slider system for supporting a camera for longitudinal movement, the system comprising:

a pair of elongate support members extending in a longitudinal direction, parallel and spaced apart from one another;

a camera mount arranged to mount a camera thereon;

a carriage assembly supported for movement in the longitudinal direction along the support members; and at least one link member pivotally coupled between the camera mount and the carriage such that the camera mount is adjustable in orientation relative to the carriage assembly.

By providing a linkage which pivotally couples the camera mount to a carriage assembly on the elongate support members, the orientation of the camera relative to the elongate supports is very flexible for accommodating different elevations and orientations using a small compact configuration of parts. Furthermore by providing a linkage comprising a pair of link members at opposing ends of the camera mount, a very stable configuration for supporting the camera is provided. Furthermore, the use of rollers ensures a smooth movement of the camera along the elongate support members so that there are no undesired jerking movements in the resulting captured image.

Preferably the link members are arranged for adjustment of an angular orientation of the camera mount relative to the carriage assembly and for adjustment of a height of the camera mount relative to the carriage assembly.

Preferably the link members and the camera mount are arranged to be fully received between the pair of elongate support members.

Preferably the carriage assembly is supported for rolling movement along the support members by use of rollers, or linear bearing incorporating rolling bearings therein.

The carriage assembly may comprise rollers arranged to engage diametrically opposing sides of each elongate support member.

Preferably there is provided a pivot fixing mechanism arranged to selectively fix orientation of the link members relative to the carriage assembly and relative to the camera mount.

In the preferred embodiments there are provided two link members, each pivotally mounted at an upper end on the camera mount and pivotally mounted on the carriage assembly at a lower end.

When the camera mount comprises a pair of pivot shafts upon which the upper ends of the link members are respectively supported, the pivot shafts are preferably supported on the camera mount parallel and spaced apart from one another at opposing ends of the camera mount such that the link members are supported for pivotal movement relative to the camera mount about respective axes oriented perpendicularly to the longitudinal direction.

When the carriage assembly comprises a pair of pivot shafts upon which the lower ends of the link members are respectively supported, the pivot shafts are preferably supported on the carriage assembly parallel and spaced apart from one another at opposing ends of the carriage assembly such that the link members are supported for pivotal movement relative to the carriage assembly about respective axes oriented perpendicularly to the longitudinal direction.

In one embodiment, the carriage assembly comprises a common carriage body upon which both of the link members are pivotally coupled. In this instance the pair of pivot shafts on the carriage assembly are preferably supported at longitudinally opposed ends of the carriage body at a fixed distance relative to one another.

Furthermore, the carriage assembly may comprise a pair of linear bearings at each of two longitudinally opposed ends of the carriage assembly receiving the pair of elongate support members slidably therethrough.

Alternatively, the carriage assembly may comprise a pair of carriage bodies supported on the elongate support members, the link members being pivotally coupled to respective ones of the carriage bodies. Preferably the pair of carriage bodies are supported on the elongate support members independently of one another so as to be adjustable in distance in the longitudinal direction relative to one another.

Each carriage body may comprise a pivot shaft upon which the link member is pivotally supported, a pair of support members at opposing ends of the pivot shaft, and a pair rollers supported at spaced apart positions on each support member such that a respective one of the elongate support members is received therebetween. Preferably the rollers, the support members and the respective pivot shaft are pivotal together relative to the link member.

When the carriage assembly comprises a pair of carriage bodies supported for independent movement relative to the camera mount by said at least one link member, and when said at least one link member comprises a pair of link members each connected between the camera mount and a respective one of the carriage bodies such that each link member is mounted at an upper end on the camera mount for pivotal movement about an upper pivot axis relative to the camera mount and is mounted on the respective carriage body at a lower end for pivotal movement about a lower pivot axis relative to the carriage body, preferably at least one of the link members comprises a hinge coupling between the upper end and the lower end thereof such that the upper and lower ends are pivotal relative to one another about a hinge axis oriented transversely to a common plane of the upper and lower pivot axes.

Furthermore, when each roller is aligned with a corresponding one of the rollers on the other support member of the respective carriage body for rotation about a common roller axis, the pivot shaft of the respective carriage body is preferably parallel to the roller axes and positioned centrally between the two roller axes.

Each link member may be fully rotatable about the pivot shaft of the respective carriage body.

The camera mount may be arranged to be coupled directly to a body of the camera.

The system may also be provided in combination with a camera supporting tripod head comprising a convex lower surface. In this instance, the camera mount comprises a bowl portion arranged to support the convex lower surface of the camera supporting tripod head thereon.

When the elongate support members comprise rigid rod members, there may be provided a mounting block supporting the pair of a elongate support members at a fixed space in a lateral direction relative to one another. The mounting block in this instance may comprise: a pair of mounting bores extending through the mounting block in the longitudinal direction so as to be arranged to slidably receive respective ones of the elongate support members therein; at least one mounting aperture extending through the mounting block in an upright orientation transversely to the longitudinal direction of the mounting bores so as to be arranged for connection to an upright supporting structure; and a pair of leg members formed integrally with the mounting block to extend downwardly therefrom and being spaced apart from one another in the lateral direction.

In alternative embodiments, the elongate support members may comprise a pair of flexible cables supported under tension. In this instance the carriage assembly preferably comprises rollers having respective grooves extending circumferentially about a peripheral surface thereof so as to be arranged to receive the grooves therein.

Some embodiments of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
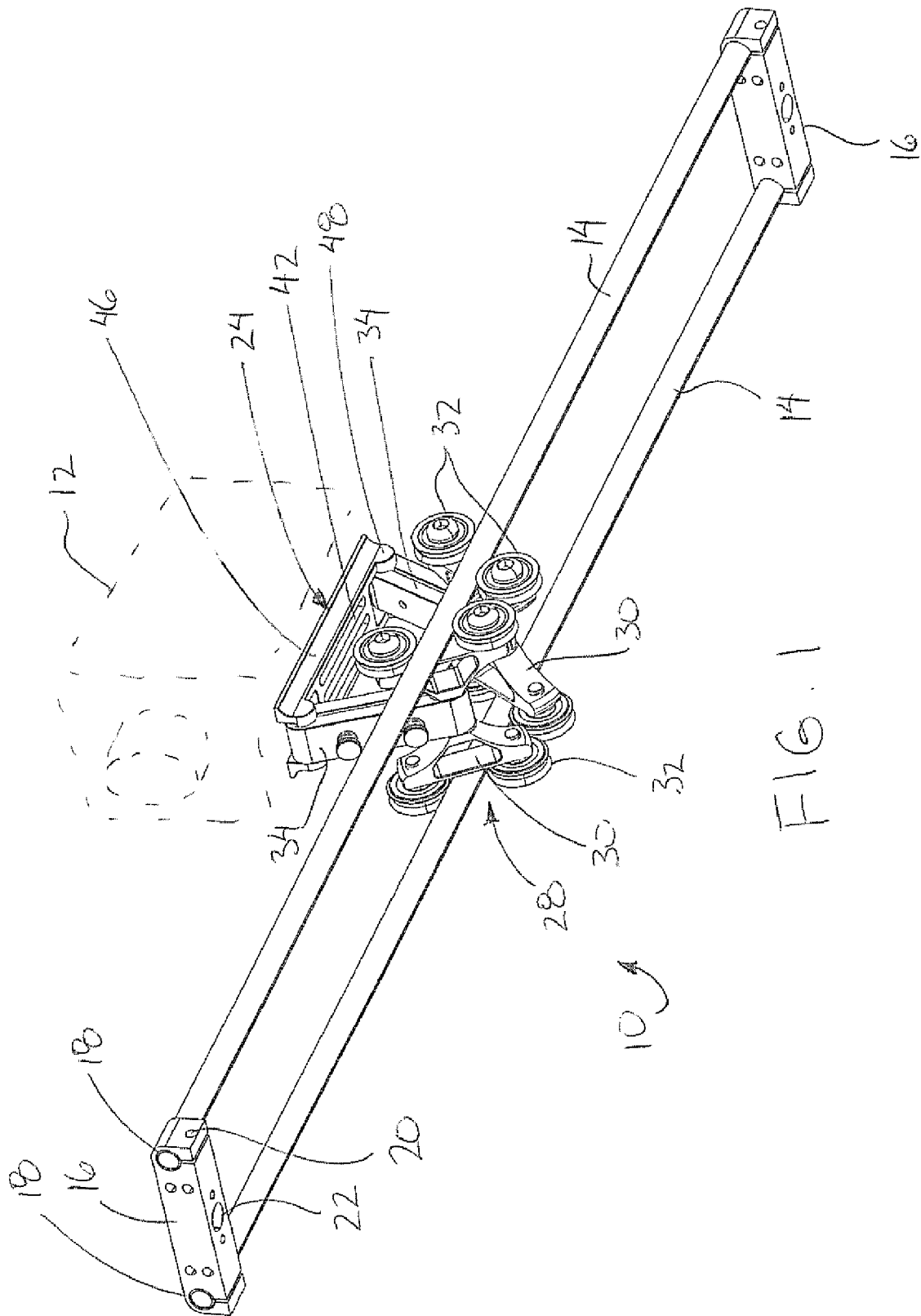
FIG. 1 is a perspective view of the first embodiment of the camera slider system.

Referring to the accompanying figures there is illustrated a camera slider system generally indicated by reference numeral 10. The system 10 is particularly suited for replicating a dolly shot using a small portable assembly of parts which support a camera 12 for movement in a longitudinal direction which typically comprises a linear sliding or rolling movement along a suitable supporting structure such as a track.

Although various embodiments of the system 10 are described and illustrated herein, the common features of the different embodiments will be first described.

In the illustrated embodiments, the supporting structure comprises two elongate support members 14 which comprise parallel and spaced apart rigid rails or rods which extend in the longitudinal direction. The two support members are typically straight in the longitudinal direction and have a round cross section. When supporting lightweight equipment thereon, the rods typically comprise carbon fibre material, however the rods forming the elongate support members 14 can be formed of steel or other stronger materials when used with heavier camera equipment.

The two support members 14 are supported parallel and spaced apart from one another by suitable mounting blocks 16 located at opposing ends of the support members. The mounting block 16 is generally elongate in a lateral direction spanning between the two support members at each end thereof. The block 16 includes two bores 18 extending parallel and spaced apart therethrough for slidably receiving the support members 14 therein. A longitudinally extending slot extends fully through the block from each bore 18 to a bottom side of the block so that the block forms a generally C shaped clamping member about each bore which can be tightened about the respective support member 14 received therethrough by a suitable clamp fastener 20 spanning across the slot for tightening the slot as required. Centrally between the two mounting bores 18 receiving the supporting members therethrough there is provided an auxiliary mounting bore 22 extending vertically through the block perpendicularly to a plane containing the two bores 18 and the support members 14 extending therethrough. The auxiliary mounting bore 22 is suitable for receiving the vertical stud of a standard camera equipment support stand known as a C-stand.

The system 10 comprises a camera mount 24 which locates a standard camera mounting connection therein upon which a body of the camera 12 can be centrally supported for relative adjustment therebetween. The camera mount includes two pivot shafts 26 supported thereon to be parallel and spaced apart from one another at opposite ends of the camera mount to define respective horizontal pivot axes which are generally horizontal and perpendicular to the longitudinal direction of the support members 14.

The camera mount 24 is supported for movement along the support members by a carriage assembly 28 which is supported directly on the two support members 14 for sliding or rolling movement therealong in the longitudinal direction. The carriage assembly comprises at least one carriage body 30 supporting suitable rollers 32 thereon which are engaged on the support members to guide the movement of the carriage body along the support members. The carriage assembly thus follows the generally linear path of the elongate support members 14.

The camera mount is adjustably supported on the carriage assembly by a suitable linkage which is pivotally coupled between the camera mount 24 and the carriage assembly 28 such that the height and angular orientation of the camera mount relative to the carriage assembly can be adjusted. The linkage generally comprises two link members 34 which are each pivotally coupled at a top end about a respective one of the pivot shafts 26 at opposing ends of the camera mounts. The two link members 34 are thus pivotal about respective independent horizontal pivot axes which are parallel and spaced apart from one another relative to the camera mount.

A bottom end of each link member 34 is pivotally coupled to a respective pivot shaft 36 on the carriage assembly. The two pivot shafts 36 of the carriage assembly are parallel and spaced apart from one another and oriented to extend perpendicularly to the elongate support members 14 at spaced apart positions in the longitudinal direction. The pivot shafts 36 are fixed relative to the respective components of the carriage assembly 28 upon which they are supported for movement together with the carriage assembly in the longitudinal direction relative to the support members 14.

Each link member comprises two side members 38 extending the full length between the upper and lower ends of the link member. The two side members 38 are arranged for mounting alongside one another such that respective inner faces of the side members abut one another. At both ends of the side members 38 the inner faces are provided with a recess arranged to receive a portion of the respective pivot shaft therein such that abutment of the inner faces of the two side members against one another serves to clamp opposing ends of the two side members about the upper and lower pivot shafts respectively.

A suitable pivot fixing mechanism in the form of clamp fasteners 40 are provided which are connected between the two side members of the link members so that tightening the clamp fasteners serves to clamp the two side members together and clamp the pivot shafts therebetween such that relative rotation between the link members and the pivot shafts is prevented in the clamped position. Releasing the clamp fasteners in turn loosens the two side members of each link member about the respective pivot shafts to permit the link members to once again be pivoted about the respective pivot shafts to vary the angular inclination thereof relative to the rail members and the camera mount.

Each of the two side members of each link member, and in turn the two link members are all arranged to be reversible and interchangeable with one another to simplify the number of components to be manufactured. The clamp fasteners may be any form of threaded screw including a suitable head which permits manual gripping for tightening or loosening the fasteners without tools being required, or optionally a suitable socket may also be provided for tighter securement with tools as may be desired.

Figure 2:
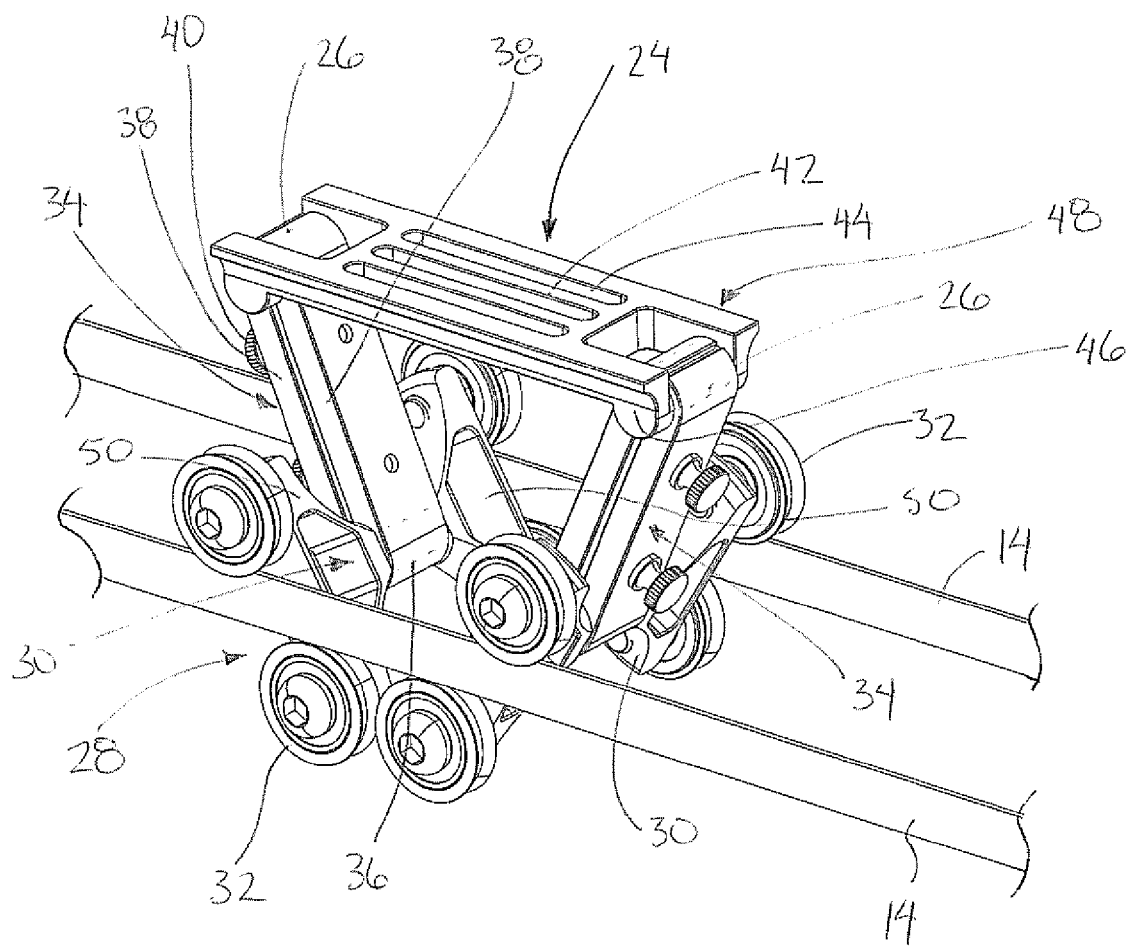
FIG. 2 is a perspective view of the top side of the camera sliding system according to FIG. 1.
Figure 3:
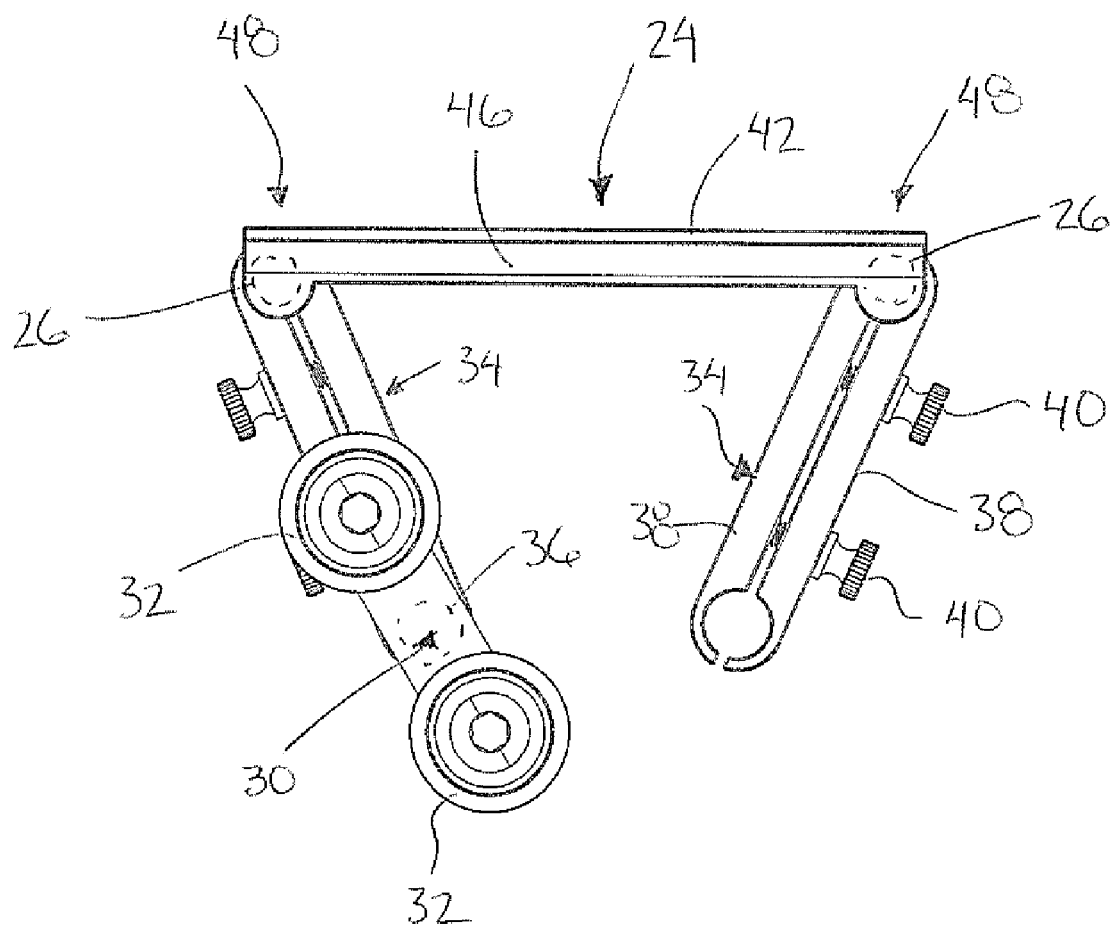
FIG. 3 is a side elevational view of the linkage and camera mount with one of the carriage bodies shown removed.
Figure 4:
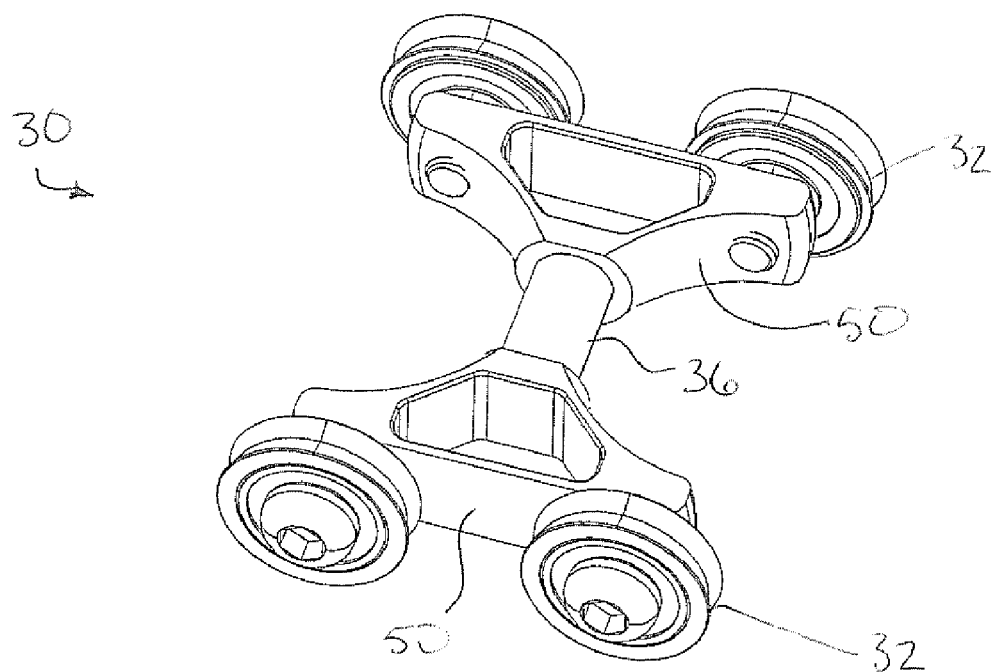
FIG. 4 is a perspective view of one of the carriage bodies of FIG. 1.
Figure 5:
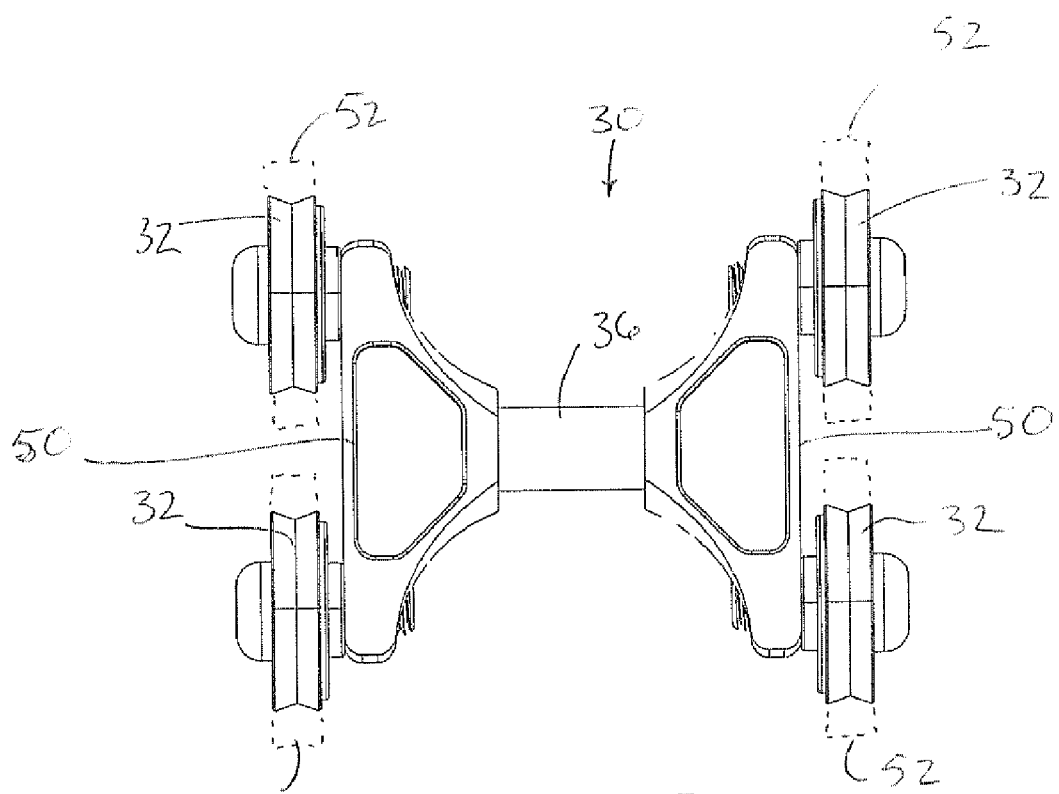
FIG. 5 is a top plan view of the carriage body according to FIG. 4.

In addition to the link members shown in FIGS. 1 through 3, auxiliary link members can also be provided which are identical in configuration to the link members shown so as to be formed of two side members clamped about the pivot shafts using clamp fasteners. The auxiliary link members may be approximately half as long in length as compared to the link members shown in FIGS. 1 through 3 so that the camera mount can be supported at a shorter distance above the support members 14 in the elevated position.

When providing a shorter length link member a single clamp fastener 40 is provided on each link member at a central location evenly spaced between the opposing ends of the link member. Alternatively when providing longer auxiliary link members, two clamp fasteners are provided at spaced apart positions between the two opposed ends so that the clamp fasteners are located adjacent the pivot shafts at the opposed ends respectively as shown in FIGS. 1 through 3.

Turning now more particularly to the first embodiment of the camera slider system shown in FIGS. 1 through 5, the camera mount 24 in this instance comprises a plate member having a central portion 42 which comprises a flat upper surface locating a plurality of longitudinally extending slots 44 therein. The slots 44 are parallel and spaced relative to one another in the lateral direction such that each slot extends substantially the full length of the central portion 42 in the longitudinal direction. The slots extend fully through from the top side to the bottom side of the central portion of the camera mount for receiving suitable fasteners therein which permit the body of the camera to be coupled directly thereto. The camera mount further comprises depending side flanges 46 which extend downwardly from respective side edges of the plate member such that the side flanges are parallel and spaced apart from one another to extend in the longitudinal direction. The two side flanges both extend outward in the longitudinal direction beyond opposing ends of the central portion to define respective end portions 48 between which the pivot shafts 26 are mounted. The pivot shaft thus each extend perpendicularly to the side flanges to extend between two respective end portions of the side flanges at longitudinally opposed ends of the camera mount. The pivot shafts 26 are spaced outwardly in the longitudinal direction relative to the central portion 42 such that the link members 34 can be coupled to the pivot shaft for pivotal movement thereabout in an unrestricted manner.

Furthermore according to the first embodiment shown in FIGS. 1 through 5, the carriage assembly comprises two carriage bodies 30 which each support a respective one of the pivot shafts 36 of the carriage assembly thereon. Accordingly each link member 34 is coupled to the pivot shaft of a respective one of the carriage bodies with the carriage bodies being independently supported on the support members 14. Each of the carriage bodies 30 supports respective ones of the rollers 32 thereon which engage the elongate support members 14 with the two carriage bodies and corresponding rollers being supported at an adjustable spacing in the longitudinal direction relative to one another.

Each carriage body centrally locates the respective pivot shaft 36 such that the pivot shaft extends in the lateral direction between two wheel support members 50 at opposing ends of the pivot shaft. Two rollers 32 are supported at spaced apart locations on each wheel support member 50 with the two wheel support members being fixed relative to one another through connection to the pivot shaft. The two rollers on each wheel support member 50 are aligned with the two wheels on the other wheel support member of the same body such that each wheel is rotatable about a respective wheel axis which is in common with the corresponding wheel of the other wheel support member. The two wheel axes are spaced apart within a common plane also locating the pivot axis of the pivot shaft centrally between the two wheel axes and parallel thereto. Accordingly the four rollers on each carriage body are spaced in a radial direction from the pivot shaft axis by an equal amount. The spacing between the two rollers on each wheel support member is suitable to readily receive a respective one of the elongate support members therebetween. In use each carriage body is pivoted about the respective pivot shaft axis thereof until the two wheels of each wheel support member are engaged upon diametrically opposed sides of the elongate support member received therebetween.

Each wheel support member is generally triangular in shape between a respective end of the pivot shaft and the two roller mounting locations respectively. A generally triangular cut-out is formed centrally within each wheel support member to reduce the weight of the carriage body as well as reducing the material used for manufacture. When the carriage bodies are supported on the elongate support members, the link members are fully pivotal or rotatable 360 degrees about the respective pivot shafts of the carriage bodies so that the inclination of the link members relative to the carriage bodies supported on the support members 14 can be adjusted at any angle. Furthermore the link members and the camera mount upon which they are supported pivotally at respective top ends thereof can all be received in the space between the two elongate support members 14 to accommodate various camera positions and mounting configurations.

The rollers 32 according to the first embodiment each comprise a wheel which is supported for rolling movement along a respective top or bottom side of the elongate support members. A peripheral surface of each wheel is generally concave to define a smaller diameter central groove relative to the larger diameter peripheral edges of the wheel which is suitable for mating engagement with the round cross section of the elongate support members shown in the illustrated embodiment.

In further embodiments the wheels defining the rollers 32 can be readily interchanged by removing a central fastener which is secured through the respective rotation axes of the rollers to fasten the rollers onto the wheel support members respectively. The wheels defining the rollers can be readily interchanged with wheels having a suitable peripheral groove which can mate with an elongate supporting structure in the form of a cable, typically supported to span under tension to suspect the carriage assembly and camera mount therefrom. In this instance the groove is typically deeper with the peripheral edges being raised relative to the central groove at the peripheral surface by a height corresponding approximately to the diameter of the cable. In yet further embodiments, an annular member of resilient material in the form of an O-ring can be stretched into place about the periphery of the rollers such that the resilient members 52 form a resilient peripheral surface on each of the wheels forming the rollers 32 in the first embodiment so as to be suitable for rolling on a suitable supporting structure such as a table top and the like.

Turning now to the second embodiment shown in FIGS. 6 through 12, the carriage body may instead comprise a single carriage body 30 which supports the two pivot shafts 36 thereon at opposing ends at a fixed spacing which is greater than the spacing in the longitudinal direction between the pivot shafts 26 located at a fixed spacing on the camera mount 24.

The camera mount 24 in this instance comprises a central bowl portion 54 which tapers downwardly and inwardly from an upper rim to a lower central opening. The bowl portion 54 is suitably shaped for mounting a commercially available tripod head of the type having a convex bottom portion with a central stud onto which a clamp fastener 56 can be threadably secured. In this manner a portion of the bowl portion 54 of the camera mount is clamped between the clamp fastener 56 and the convex bottom of the tripod head so that the tripod head can be fixed onto the camera mount at various orientations therebetween. The tripod head typically comprises a vertical pivot axis and a horizontal pivot axis between the bottom convex portion and an upper camera mounting plate thereof arranged to support the body of a camera directly thereon.

In addition to the bowl portion 54, the camera mount further comprises a pivot shaft mount at two diametrically opposed sides of the bowl portion 54. Each pivot shaft mount comprises two mounting portions 58 which extend outwardly from the bowl diametrically opposite the other pivot shaft mount. Each of the pivot shafts 26 of the camera mount is mounted horizontally between a respective pair of the mounting portions 58 so as to be spaced outwardly from the upper rim of the bowl portion 54 parallel and spaced apart from the other pivot shaft for unrestricted pivoting movement of the upper ends of the link members pivotally coupled thereto respectively.

The carriage body is supported for sliding movement on the elongate support members by a pair of spaced apart linear bearings 60 at each of the longitudinally opposed ends of the carriage body. The two bearings at each end are aligned with corresponding ones of the two bearing at the opposing ends such that the elongate support members 14 can be received through one of the bearings at each of the two longitudinally opposed ends with a portion of the support members between the bearings remaining exposed along an outer side thereof. The exposed portion can be readily gripped manually by a user for optimal control of the placement of the carriage assembly along the support members. The linear bearings 60 are all supported on the common carriage body so that the longitudinal spacing therebetween is fixed.

In some embodiments the inner surface of each of the linear bearings 60 comprises a plurality of roller bearings which define the rollers 32 which support the carriage body for rolling movement along the support members 14. In alternative embodiments each of the linear bearing 60 may comprise a sleeve of material having a low coefficient of friction, for example Teflon, which is supported in close tolerance about the circumference of the support members for relative sliding movement therealong.

The carriage body includes a central through opening 62 between the top and bottom sides thereof such that the opening is suitable for receiving the bowl portion 54 of the camera mount therein between the pivot shafts 36 at opposing ends of the carriage assembly. The central opening 62 is generally oval in shape so as to be elongate in a longitudinal direction so as not to restrict pivotal movement of the camera mount generally about a horizontal lateral axis extending between the two support members 14 relative to the carriage body. The upper rim of the central opening 62 comprises two concave surfaces 64 along opposed longitudinally extending sides of the body upon which the convex bottom surface of the bowl portion 54 can be engaged in a fixed mounting mode as shown in FIGS. 6 through 11. The mating shape of the concave surfaces 64 and the convex bottom of the bowl portion of the camera mount permits some relative sliding therebetween to locate the camera mount relative to the carriage body as may be desired.

An upper surface of the carriage body includes a recessed portion 66 spanning between longitudinally opposed ends of the opening 62 and the respective mounting locations of the two pivot shafts 36 at opposing ends of the body respectively. The recessed portions in the upper surface serve to receive the mounting portions 58 of the camera mount therein when the camera mount is engaged directly upon the top side of the carriage body. The recessed portions 66 are deeper directly below each pivot shaft 36 to provide unrestricted coupling and pivoting of the link members to the pivot shafts respectively. Each of the pivot shafts 36 on the carriage body are supported at opposing ends thereof by suitable protrusions on the upper surface which protrude upwardly relative to the recessed portion 66 such that a central portion of each pivot shaft is spaced above the upper surface of the body between the two end portions 68 which are fastened to the protrusions on the upper surface of the carriage body so that the pivot shafts are fixed relative to the carriage body.

A rail clamp 70 is provided on the bottom side of the carriage body such that one of the elongate support members 14 is slidably received between the rail clamp 70 and a portion of the carriage body. By providing a suitable fastener which selectively clamps the rail clamp 70 against the body with the support member received therebetween, the longitudinal position of the carriage body along the support members can be selectively fixed at any given location as may be desired.

Figure 12:
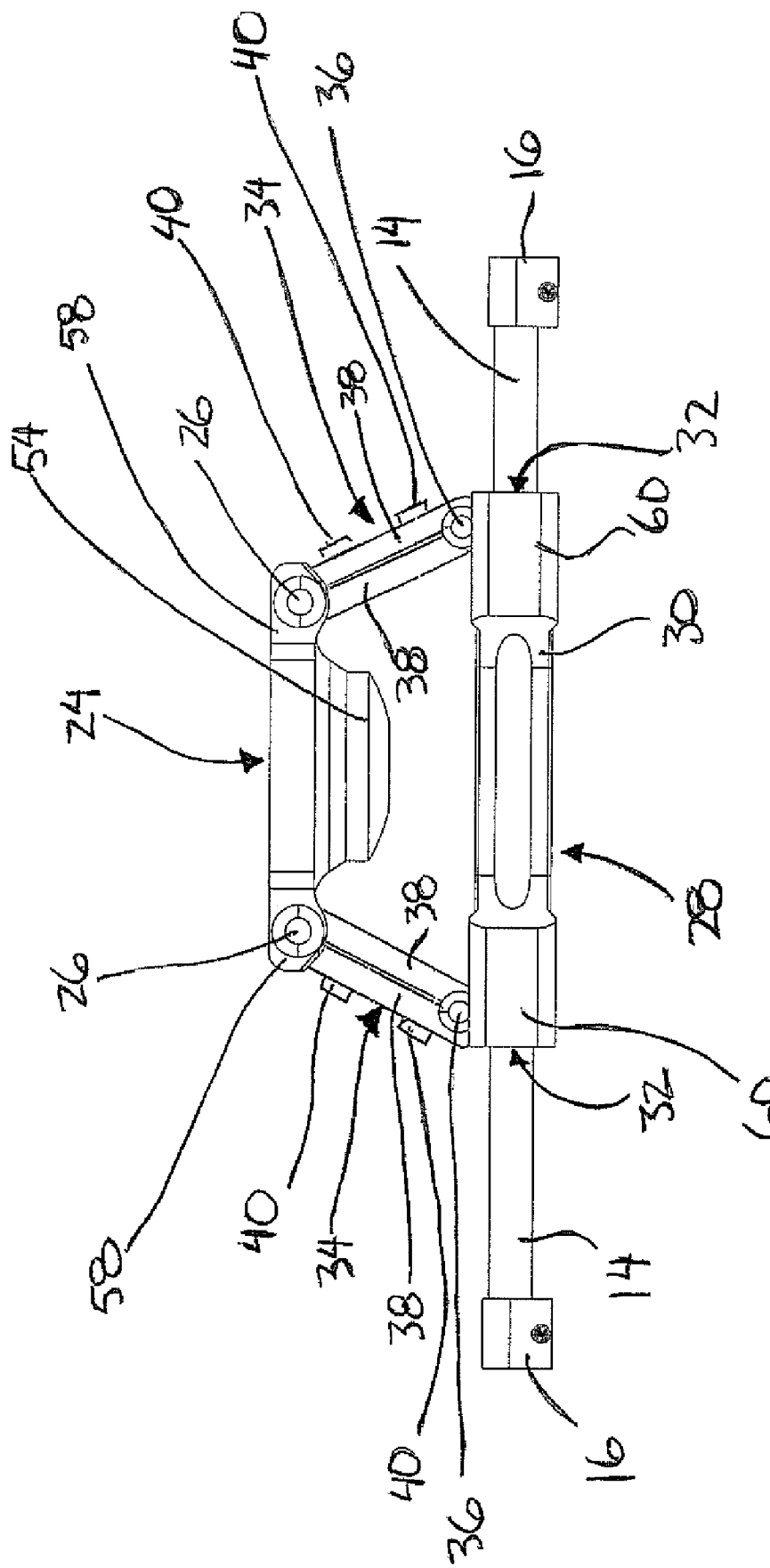
FIG. 12 is a side elevational view of the system of FIG. 6 shown in an alternative mode of operation.

In a first mode of operation as shown in FIG. 12, link members of the type described above comprising two side members 38 clamped together by clamp fasteners 40 are coupled between each pivot shaft 26 on the camera mount and the corresponding pivot shaft 38 on the carriage body so that pivoting of the link members relative to the camera mount and the carriage body permits the angular orientation of the camera mount as well as the elevation of the camera mount relative to the carriage body to be adjusted.

In a second mode of operation as shown in FIGS. 6 through 11 the camera mounts can be fixed onto the top side of the carriage body by engaging the convex bottom surface of the bowl portion 54 onto the two laterally opposed concave surfaces 64 on the carriage body. In order to fix the camera mount onto the carriage body, a pair of clamp members 72 are provided such that each clamp member overlaps one of the pivot shafts on the carriage body and the corresponding adjacent pivot shaft of the camera mount to prevent upward release of the camera mount from the carriage body when a suitable fastener is coupled through a central aperture in the clamp member into an anchor aperture 74 in the top side of the body 30 between the two corresponding pivot shafts. Each clamp member 72 comprises a single side member 38 of a shorter one of the link members locating a single central clamp fastener therein. By overlapping the two pivot shafts at each end of the assembly by the clamp members which are in turn fastened to the carriage body the camera mount is effectively clamped against the top side of the carriage body to be fixed therewith for longitudinal sliding movement in the longitudinal direction of the support members.

Using the camera slider system as described herein, a camera can be supported in a variety of configurations using low cost equipment of simple construction. Using the configuration shown in FIG. 1, a camera body can be secured directly onto the camera mount for rolling movement above the elongate support members which comprise rigid rods while the camera mount and camera supported thereon remain adjustable both in height and inclination relative to the support members. The carriage assembly is also readily operable to support the camera mount in a suspended configuration below the elongate support members as may be desired. By interchanging the rollers 32 with other wheels having a suitable profile for being suspended from cable, the camera slider system can be readily adapted for rolling movement along a cable structure. By further modifying the rollers to include a resilient peripheral surface using resilient members 52 stretched onto the periphery of the rollers, the carriage assembly can also support the camera mount for rolling movement along any supporting surface such as a table top and the like.

The configuration of the mounting blocks 16 readily permits the support members to be supported on various common camera supporting equipment including C stands or tripods or any combination thereof supported at opposing ends of the support members in a more stable configuration than the prior art.

Alternatively in the embodiment of FIG. 12 the camera mount can be adapted to support a camera thereon using a tripod head which is adjustably mounted within the bowl portion of the camera mount while the camera mount remains adjustable both in height and in angular orientation by pivoting of the link members relative to the camera mount and the carriage body. In any embodiment, tightening of the clamp fasteners 40 of each link member permits the link member to be fixed in place relative to the pivot shafts upon which it is pivotally supported to set the camera mount at any one of a plurality of fixed positions relative to the carriage assembly.

Figure 6:
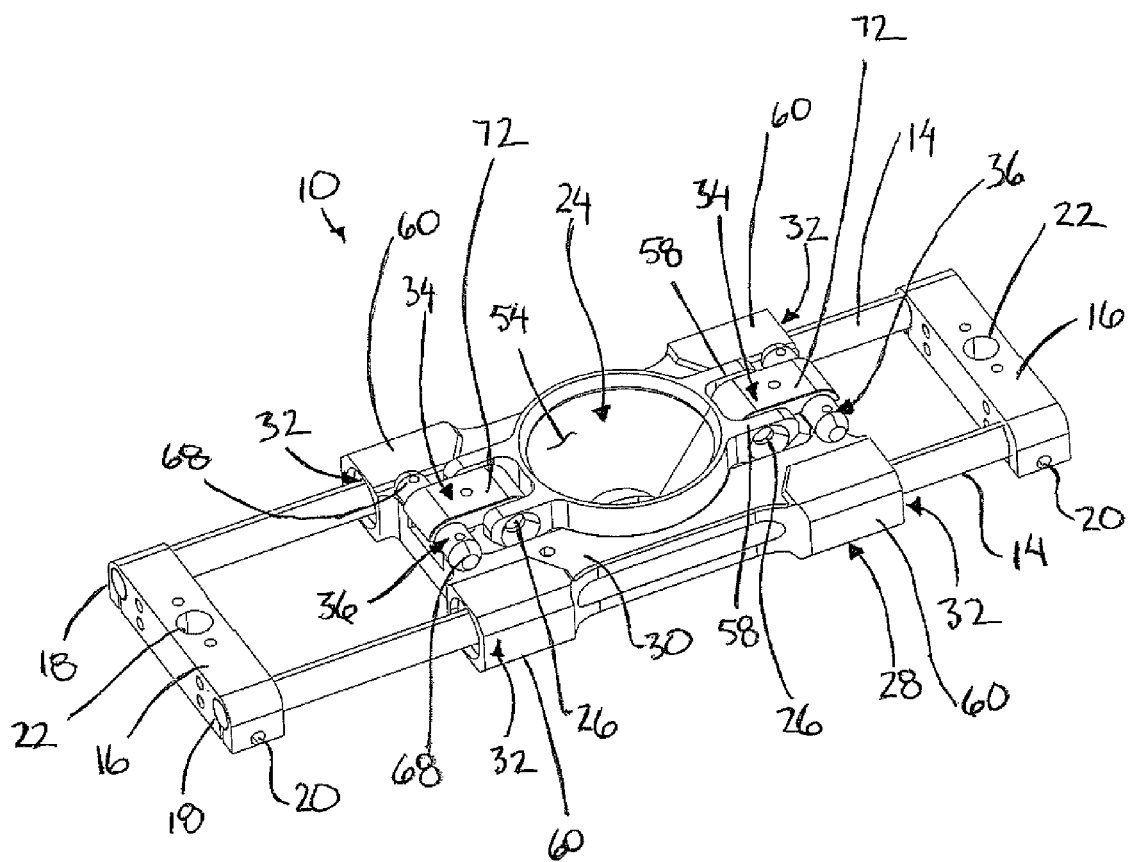
FIG. 6 is a perspective view of a second embodiment of a camera sliding system.
Figure 7:
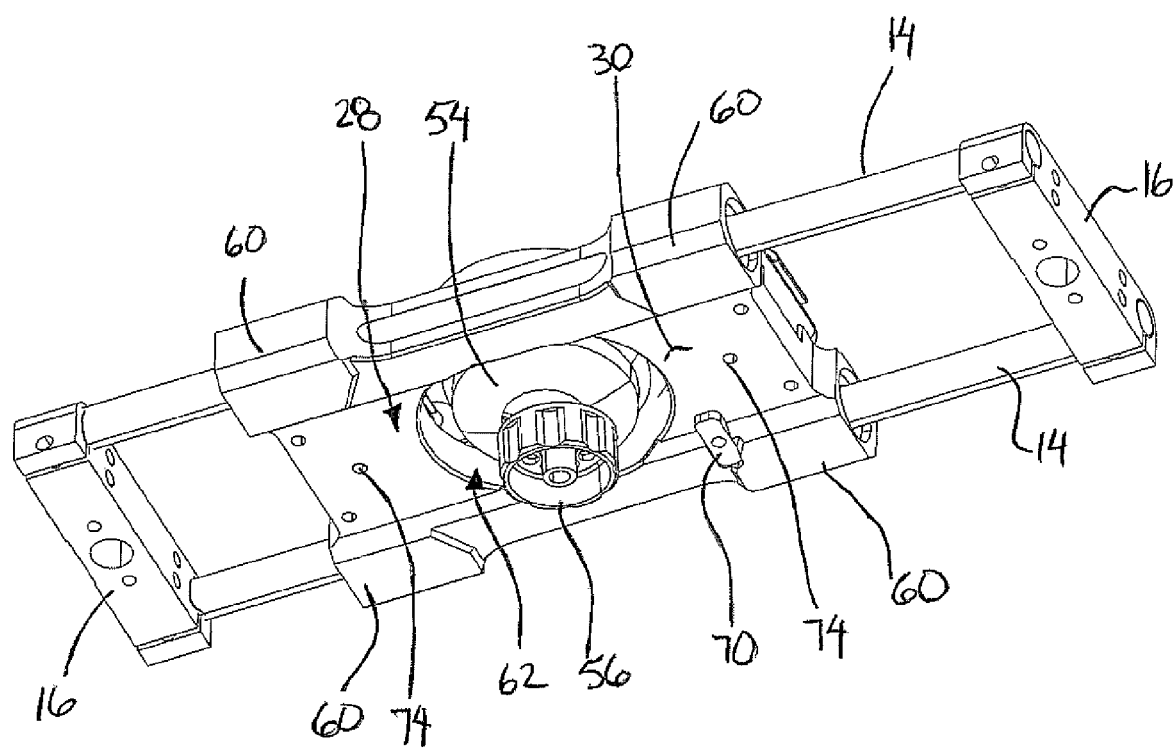
FIG. 7 is a perspective view of a bottom side of the system according to FIG. 6.
Figure 8:
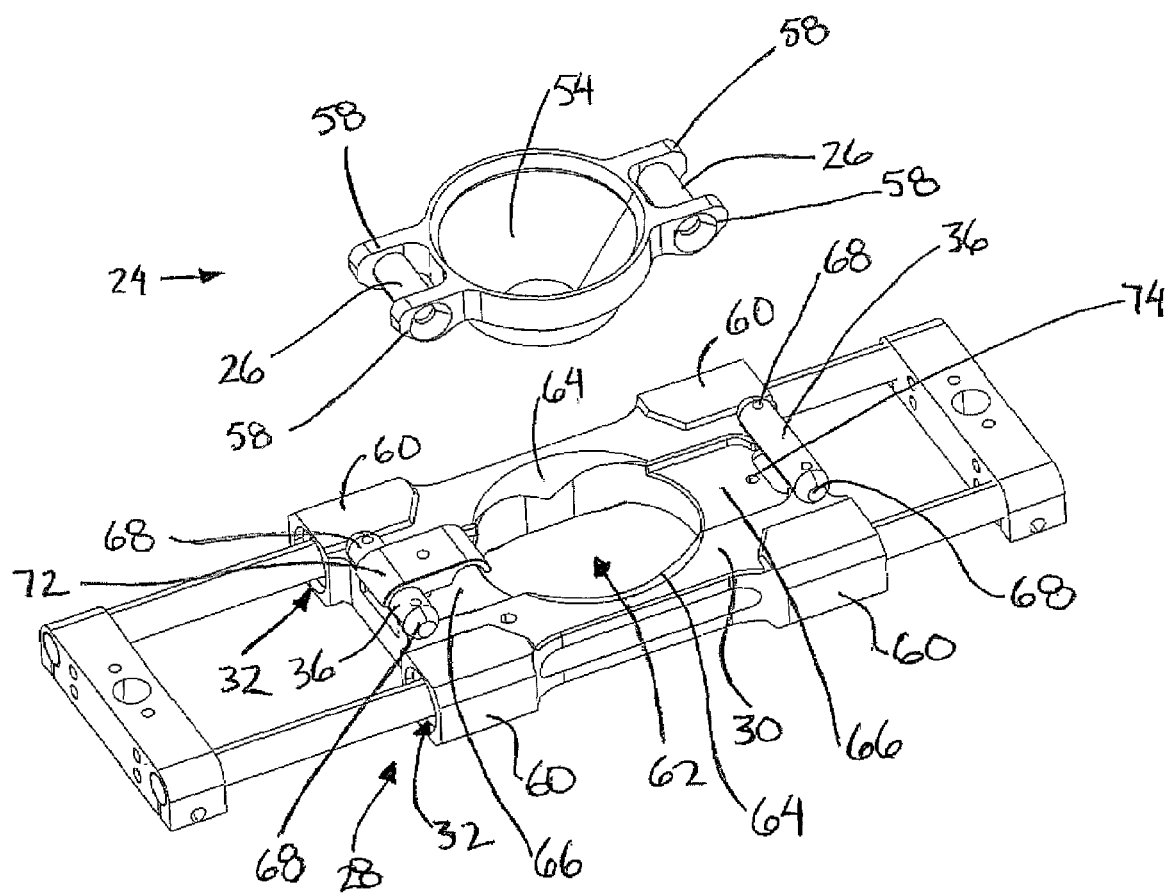
FIG. 8 is a perspective view of a top side of the carriage body of the system according to FIG. 6 in which the camera mount is shown separated above the carriage body.
Figure 9:
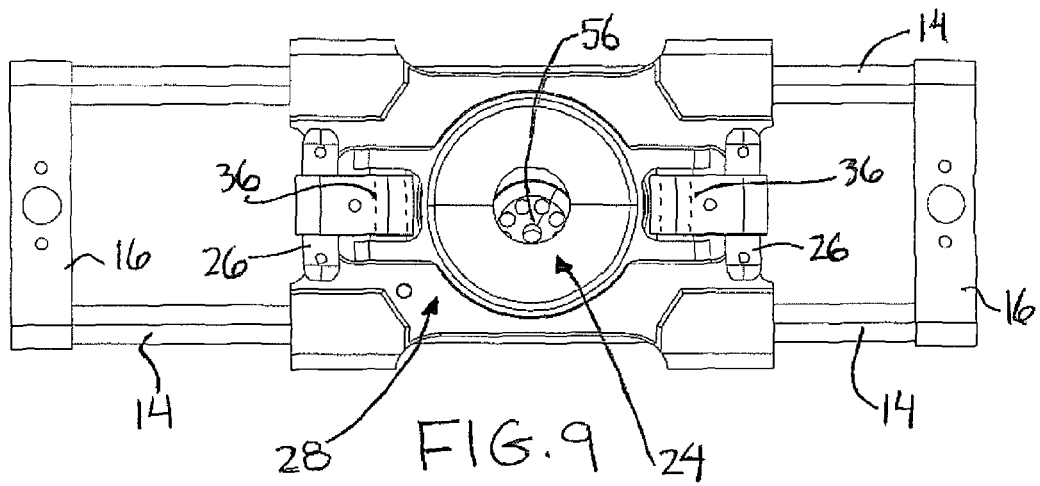
FIGS. 9, 10 and 11 are respective top plan, side elevational and bottom plan views of the camera slider system according to FIG. 6.
Figure 10:
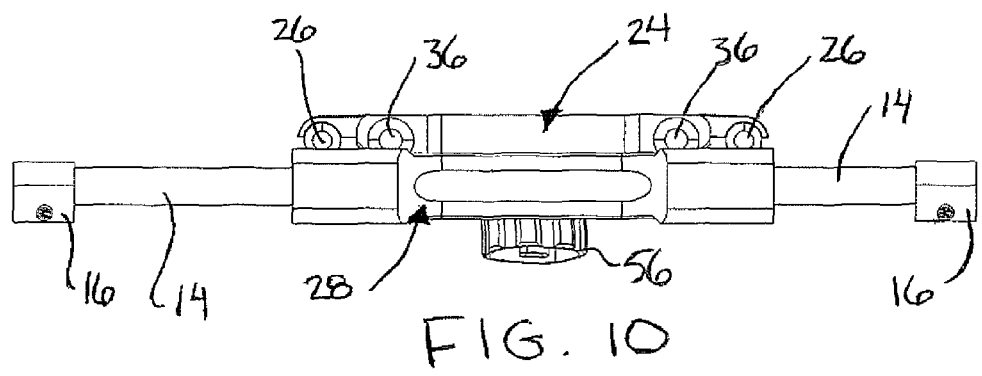
Figure 11:
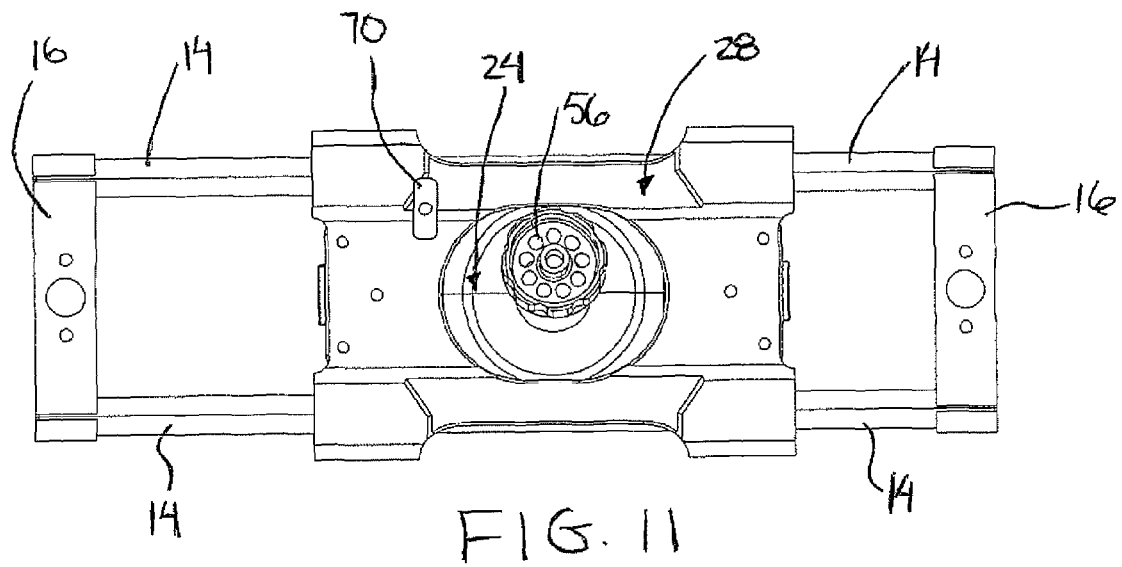

As further shown in FIG. 6, in a further mode of operation, a camera mount suitable for supporting a camera using a tripod head thereon can be fixed onto the carriage body by clamping the pivot shafts to one another onto the top side of the carriage body. In this manner the inclination of the camera relative to the support members can be adjusted using the horizontal and vertical pivot axes of the tripod head.

In yet further arrangements, the system according to FIG. 12 may be varied such that one of the link members 34 is longer than the other so that the camera mount 24 is more readily supported at an inclination relative to the carriage assembly 30 therebelow. This arrangement is particularly suited for positioning the elongate support members 14 at an upward inclination while maintaining the camera mount 24 in a substantially horizontal orientation relative to the carriage assembly supported for sliding movement at an inclination along the sloped support members. For minor inclinations of the support members, links of equal length can still be used with the angular orientation thereof being different from one another relative to the carriage and camera mount to level the camera mount as may be desired. In either instance of varying inclinations of the support members, the bowl portion 54 of the camera mount still permits fine adjustment of the leveling of the camera relative to the camera mount even if the camera mount is not entirely level.

Figure 13:
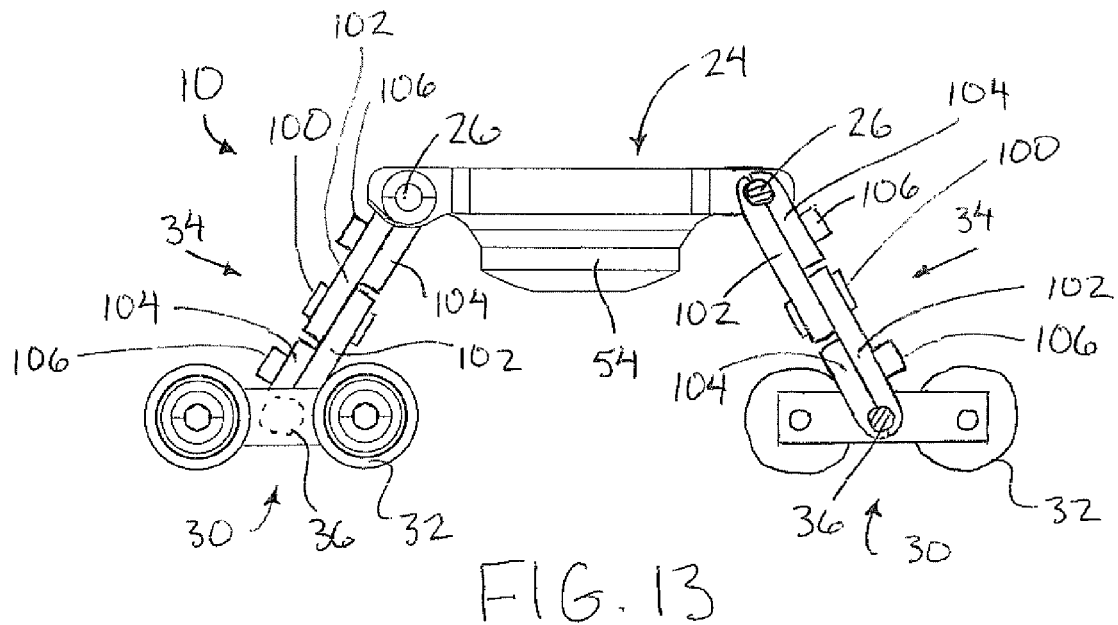
FIG. 13 is a side elevational view of a further configuration of the camera sliding system comprising components from the first and second embodiments noted above and a further embodiment of the link members.
Figure 14:
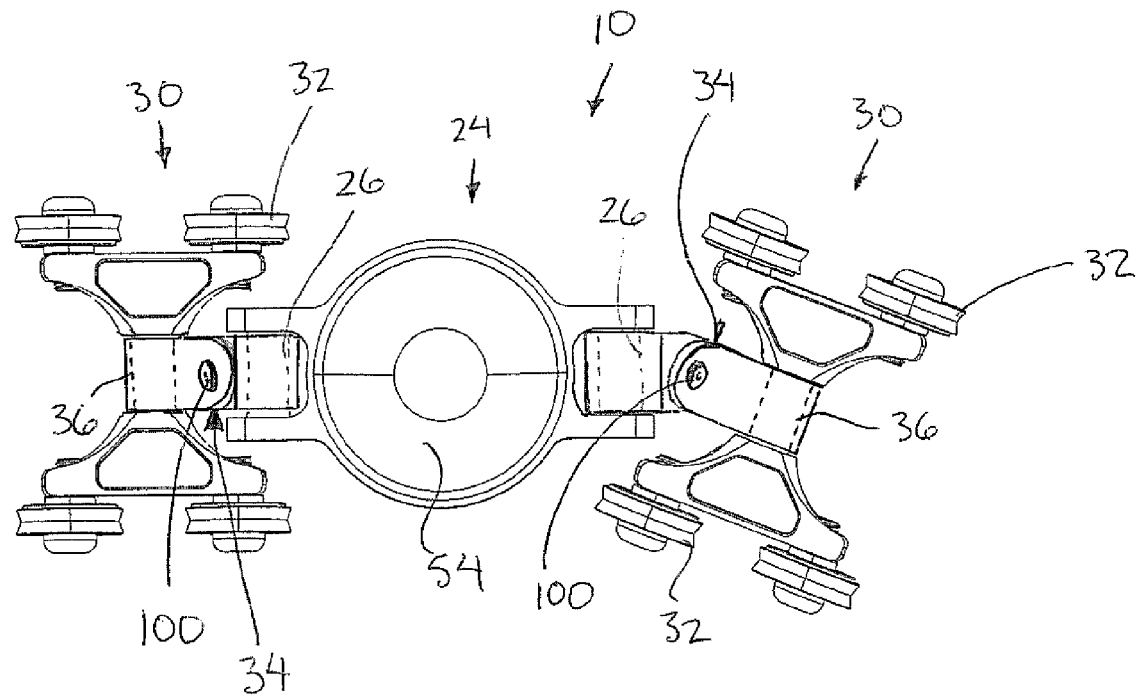
FIG. 14 is a top plan view of the camera sliding system according to FIG. 13.

Turning now more particularly to the embodiment of FIGS. 13 and 14, a camera mount 24 of the type shown in FIGS. 6 through 12 comprising a bowl portion 54 is shown mounted together with a carriage assembly comprising two separate carriage body 30 as shown in FIGS. 1 through 5. Similarly to the previous embodiments the two link members 34 are pivotally coupled at opposing ends of the camera mount on respective pivot shafts at respective upper ends thereof while also being pivotally mounted on respective pivot shafts of the two independent carriage bodies 30 at the lower end thereof. Orienting the carriage bodies about their respective pivot axes relative to the link members such that all of the wheels axes are in a generally common plane as shown in FIG. 13 permits a camera to be supported on the camera mount for rolling movement along a supporting surface, such as the horizontal surface of a table for example. Annular members of resilient material 52 as described above are typically provided on the rollers of the carriage bodies in this instance.

The link members of FIGS. 13 and 14 differ from previous embodiments in that each of the link members 34 in this instance is provided with a central hinge coupling which is generally centered so as to be spaced evenly from the upper and the lower end of the link member between which the hinge coupling is located. Under normal operation the upper and lower ends of the link members are aligned with one another such that the first pivot axis of the pivot shaft upon which the upper end of the link member is pivotal lies parallel to a second pivot axis of the pivot shaft onto which the lower end of the link member is pivotal within a common plane therewith. The hinge coupling permits relative pivotal movement between the upper and lower ends of the link member about a hinge axis which is oriented perpendicularly to the common plane containing the upper pivot axis and lower pivot axis of the pivot shafts of the upper and lower ends of the link member respectively. Pivoting of the upper end relative to the lower end within each link member results in orientation of the lower pivot axis of pivotal movement between the link member and the respective carriage body to be adjustable relative to the upper pivot axis of pivotal movement between the link member and the camera mount.

As shown in the top view of FIG. 14, one of the link members shown at the left side is positioned in a substantially straight orientation such that the rollers of the associated carriage body are arranged for rolling movement in the longitudinal direction which extends between opposing ends of the camera mount. The link member shown at the right side of the Figure is angularly offset into an offset position such that the upper and lower pivot axes of the link member are non-parallel but remain in a generally common plane with one another by being pivoted about the hinge axis of hinge coupling 100 which is perpendicular to the common plane of the upper and lower pivot axes. In this arrangement, the rollers of the respective carriage body coupled to the link member in the offset position are oriented for rolling movement in an offset direction which is angularly offset from the longitudinal direction extending between opposing ends of the camera mount so as to be angularly offset from the direction of rolling movement of the wheels of the other link member. Pivoting of the upper and lower ends of the link member relative to one another about the hinge coupling axis 100 thus permits controlling a degree of curvature of the path followed by the rollers of the two carriage bodies for steering the carriage sliding system for rolling movement along a non-linear path.

Each of the link members 34 according to FIGS. 13 and 14 comprises two end portions 102 which are pivotally coupled at respective inner ends to one another at the hinge coupling. The opposing outer ends of the two end portions 102 are each arranged to be coupled to a respective clamp member 104 with the outer end of the end portion 102 and of the clamp member 104 each including corresponding recesses on the inner faces thereof arranged to be clamped about diametrically opposed sides of the respective pivot shaft received therethrough. A suitable clamp fastener 106 selectively clamps the clamp member and the end portion upon which it is mounted onto opposing sides of the pivot shaft to frictionally retain orientation of the link member about the pivot shaft when tightening the clamp fastener. Releasing the fastener permits the pivot shaft to be readily pivoted relative to the respective end of the link member.

Figure 15:
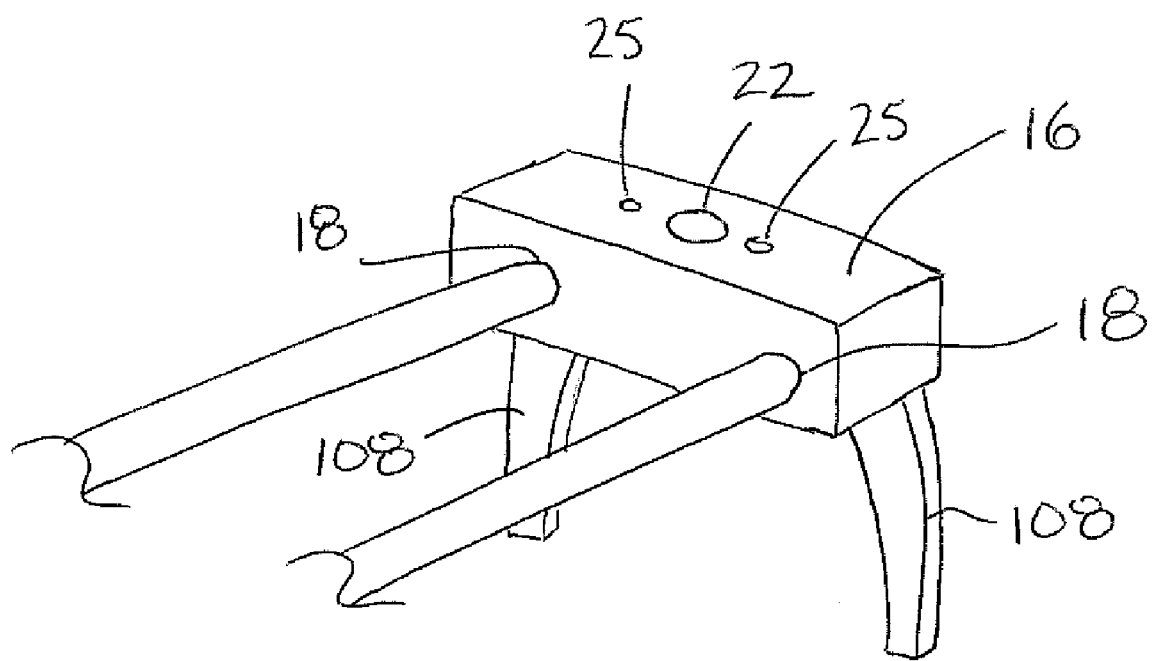
FIG. 15 is a perspective view of a further embodiment of the mounting block.

Turning now to FIG. 15, a further embodiment of the mounting block 16 is illustrated in which the block is arranged to have a pair of mounting bores 18 extending through the block in the longitudinal direction parallel and spaced apart from one another so as to be arranged to slidably received the respective ones of the elongate support members 14 slidably therethrough as in the previous embodiments. Clamp fasteners 20 fix the position of the mounting block relative to the support members. Also similarly to the previous embodiment a central auxiliary bore 22 extends vertically through the block perpendicularly to the longitudinal direction of the bores to receive the vertical mounting rod, for example a ⅝ of an inch diameter rod of an upright supporting structure such as a C-stand. The mounting block further comprises auxiliary mounting apertures 25 extending vertically through the block for receiving fasteners of a tripod head mounting bracket to support a camera thereon.

The mounting block 16 of FIG. 15 differs from the previous embodiment in that two integral leg members 108 are formed integrally with the block to extend generally downwardly therefrom at spaced apart positions in the lateral direction corresponding approximately to a spacing between the two support members 14. The two leg members 108 are positioned adjacent the respective mounting bores 18 at opposing ends of the mounting block 16 to extend downwardly from the body of the block by a height corresponding to minimum clearance required between the support members 14 and a supporting surface, for example a tabletop upon which the support members 14 are to be supported to provide space for the clamp fastener 56 of the bowl portion 54 of the camera mount.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A camera slider system for supporting a camera for longitudinal movement, the system comprising:
   a pair of elongate support members extending in a longitudinal direction, parallel and spaced apart from one another;
   a camera mount arranged to mount a camera thereon;
   a carriage assembly supported for movement in the longitudinal direction along the support members; and
   at least one link member pivotally coupled between the camera mount and the carriage such that the camera mount is adjustable in orientation relative to the carriage assembly;
   said at least one link member being arranged for adjustment of a height of the camera mount relative to the carriage assembly.

2. The system according to claim 1 wherein said at least one link member is arranged for adjustment of an angular orientation of the camera mount relative to the carriage assembly.

3. The system according to claim 1 wherein said at least one link member comprises a link member pivotally mounted at an upper end on the camera mount and pivotally mounted on the carriage assembly at a lower end.

4. The system according to claim 1 wherein the carriage assembly is supported for rolling movement along the support member.

5. The system according to claim 4 wherein the carriage assembly comprises rollers arranged to engage diametrically opposing sides of each elongate support member.

6. The system according to claim 4 wherein the elongate support members comprise a pair of cables and wherein the carriage assembly comprises rollers having respective grooves extending circumferentially about a peripheral surface thereof so as to be arranged to receive the grooves therein.

7. The system according to claim 1 wherein there is provided a pivot fixing mechanism arranged to selectively fix orientation of said at least one link member relative to the carriage assembly and relative to the camera mount.

8. A camera slider system for supporting a camera for longitudinal movement, the system comprising:
   a pair of elongate support members extending in a longitudinal direction, parallel and spaced apart from one another;
   a camera mount arranged to mount a camera thereon;
   a carriage assembly supported for movement in the longitudinal direction along the support members: and
   a pair of link members pivotally coupled between the camera mount and the carriage such that the camera mount is adjustable in orientation relative to the carriage assembly;
   each link member being pivotally mounted at an upper end on the camera mount and being pivotally mounted on the carriage assembly at a lower end.

9. The system according to claim 8 wherein the camera mount comprises a pair of pivot shafts upon which the upper ends of the link members are respectively supported, the pivot shafts being supported on the camera mount parallel and spaced apart from one another at opposing ends of the camera mount such that the link members are supported for pivotal movement relative to the camera mount about respective axes oriented perpendicularly to the longitudinal direction.

10. The system according to claim 8 wherein the carriage assembly comprises a pair of pivot shafts upon which the lower ends of the link members are respectively supported, the pivot shafts being supported on the carriage assembly parallel and spaced apart from one another at opposing ends of the carriage assembly such that the link members are supported for pivotal movement relative to the carriage assembly about respective axes oriented perpendicularly to the longitudinal direction.

11. The system according to claim 8 wherein the carriage assembly comprises a common carriage body upon which both of the link members are pivotally coupled.

12. The system according to claim 11 wherein there is provided a pair of pivot shafts supported at longitudinally opposed ends of the carriage body at a fixed distance relative to one another upon which the lower ends of the link members are pivotally supported respectively.

13. The system according to claim 8 wherein the carriage assembly comprises a pair of carriage bodies supported on the elongate support members, the link members being pivotally coupled to respective ones of the carriage bodies, wherein the pair of carriage bodies are supported on the elongate support members independently of one another so as to be adjustable in distance in the longitudinal direction relative to one another.

14. The system according to claim 13 wherein each carriage body comprises a pivot shaft upon which the link member is pivotally supported, a pair of support members at opposing ends of the pivot shaft, and a pair rollers supported at spaced apart positions on each support member such that a respective one of the elongate support members is received therebetween and wherein the rollers, the support members and the respective pivot shaft are pivotal together relative to the link member.

15. The system according to claim 14 wherein each roller is aligned with a corresponding one of the rollers on the other support member of the respective carriage body for rotation about a common roller axis and wherein the pivot shaft of the respective carriage body is parallel to the roller axes and is positioned centrally between the two roller axes.

16. The system according to claim 13 wherein each link member is fully rotatable about the pivot shaft of the respective carriage body.

17. The system according to claim 8 wherein:
   the carriage assembly comprises a pair of carriage bodies supported for independent movement relative to the camera mount by the pair of link members respectively;
   the pair of link members each being connected between the camera mount and a respective one of the carriage bodies such that each link member is mounted at an upper end on the camera mount for pivotal movement about an upper pivot axis relative to the camera mount and is mounted on the respective carriage body at a lower end for pivotal movement about a lower pivot axis relative to the carriage body.

18. The system according to claim 17 wherein at least one of the link members comprises a hinge coupling between the upper end and the lower end thereof such that the upper and lower ends are pivotal relative to one another about a hinge axis oriented transversely to a common plane of the upper and lower pivot axes.

19. A camera slider system for supporting a camera for longitudinal movement, the system comprising:
   a pair of elongate support members extending in a longitudinal direction, parallel and spaced apart from one another;
   a camera mount arranged to mount a camera thereon;
   a carriage assembly supported for movement in the longitudinal direction along the support members;
   at least one link member pivotally coupled between the camera mount and the carriage such that the camera mount is adjustable in orientation relative to the carriage assembly; and
   a mounting block supporting the pair of a elongate support members at a fixed space in a lateral direction relative to one another, the mounting block comprising:
      a pair of mounting bores extending through the mounting block in the longitudinal direction so as to be arranged to slidably receive respective ones of the elongate support members therein;
      at least one mounting aperture extending through the mounting block in an upright orientation transversely to the longitudinal direction of the mounting bores so as to be arranged for connection to an upright supporting structure; and
      a pair of leg members formed integrally with the mounting block to extend downwardly therefrom and being spaced apart from one another in the lateral direction.

20. The system according to claim 1 wherein the carriage assembly comprises a pair of linear bearings at each of two longitudinally opposed ends of the carriage assembly receiving the pair of elongate support members slidably therethrough.

\* \* \* \* \*